(12) United States Patent  
Kotake et al.

(10) Patent No.: US 11,474,256 B2  
(45) Date of Patent: Oct. 18, 2022

(54) DATA PROCESSING DEVICE, LASER RADAR DEVICE, AND WIND MEASUREMENT SYSTEM

(71) Applicant: Mitsubishi Electric Corporation, Tokyo (JP)

(72) Inventors: Nobuki Kotake, Tokyo (JP); Shumpei Kameyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 753 days.

(21) Appl. No.: 16/344,622

(22) PCT Filed: Nov. 28, 2016

(86) PCT No.: PCT/JP2016/085109  
§ 371 (c)(1),  
(2) Date: Apr. 24, 2019

(87) PCT Pub. No.: WO2018/096665  
PCT Pub. Date: May 31, 2018

(65) Prior Publication Data  
US 2020/0064485 A1 Feb. 27, 2020

(51) Int. Cl.  
*G01P 3/36* (2006.01)  
*G01S 17/95* (2006.01)  
(Continued)

(52) U.S. Cl.  
CPC .............. *G01S 17/95* (2013.01); *G01S 17/87* (2013.01); *G01S 7/4804* (2013.01); *G01S 7/4808* (2013.01); *G01S 17/58* (2013.01)

(58) Field of Classification Search  
CPC .......... G01S 17/95; G01S 17/87; G01S 17/58; G01S 7/4804; G01S 7/4808  
See application file for complete search history.

(56) References Cited

U.S. PATENT DOCUMENTS 6,946,751 B2   9/2005   Yoshida et al.  
2004/0183307 A1   9/2004   Yoshida et al.  
(Continued)

FOREIGN PATENT DOCUMENTS

EP   1596222 A1 * 11/2005   ............. G01S 17/95  
EP   2 617 993 A2   7/2013  
(Continued)

OTHER PUBLICATIONS

European Office Action for European Application No. 16922567.9, dated Jul. 16, 2020.  
(Continued)

*Primary Examiner* — Mark Hellner  
(74) *Attorney, Agent, or Firm* — Birch, Stewart, Kolasch & Birch, LLP

(57) ABSTRACT

A data processing device of the present invention includes: a data communication device configured to communicate with a laser radar device to acquire a value of line-of-sight wind-speed, a laser emission angle, attitude information, position information, and a time; a storage device configured to store the value of line-of-sight wind-speed and the time; a central processing unit configured to run a data selector to select a value of line-of-sight wind-speed stored in the storage device and being present within a set time period from a time about the value of line-of-sight wind-speed which is newly acquired by the data communication device, and configured to run a wind vector calculator to calculate a wind vector using the newly acquired value of line-of-sight wind-speed and using the selected value of line-of-sight wind-speed; and a memory configured to preserve the data selector and the wind vector calculator.

6 Claims, 11 Drawing Sheets

(51) Int. Cl.
*G01S 17/87* (2020.01)
*G01S 7/48* (2006.01)
*G01S 17/58* (2006.01)

(56) References Cited

U.S. PATENT DOCUMENTS

| | | |
|---|---|---|
| 2010/0079330 A1 | 4/2010 | Venkatachalam et al. |
| 2012/0274937 A1* | 11/2012 | Hays ................ G01S 17/95 |
| | | 356/450 |
| 2014/0028495 A1 | 1/2014 | Schroeder et al. |

FOREIGN PATENT DOCUMENTS

| | | |
|---|---|---|
| JP | 2004-301116 A | 10/2004 |
| JP | 4102278 B2 | 6/2008 |
| JP | 2011-520127 A | 7/2011 |
| WO | WO 2014/084973 A1 | 6/2014 |

OTHER PUBLICATIONS

Summons to Attend Oral Proceedings Pursuant to Rule 115(1) EPC dated Jan. 22, 2021 issued in the corresponding European Patent Application No. 16922567.9.
Extended European Search Report issued in corresponding European Application No. 16922567.9 dated Oct. 18, 2019.
International Search Report issued in PCT/JP2016/085109 (PCT/ISA/210), dated Feb. 21, 2017.

* cited by examiner

Integration For Each Range Bin

Top view

DATA PROCESSING DEVICE, LASER RADAR DEVICE, AND WIND MEASUREMENT SYSTEM

TECHNICAL FIELD

The present invention relates to a data processing device, laser radar device and wind measurement system.

BACKGROUND ART

Radar devices have been known as devices which measure positions of objects existing in remote points. A radar device emits a wave such as an electromagnetic wave or sound wave into a space, receives a wave reflected by an object, and analyzes its received signal, thereby measuring the distance and angle between the radar device and the object. Among radars, a weather radar has been known which focus on micro liquids and/or solid particles (aerosol) floating in the atmosphere, and is capable of detecting a moving speed of aerosol, that is, a wind speed, from a phase rotation amount of the reflected wave. Among weather radars, a laser radar device which particularly uses light as electromagnetic waves is capable of emitting a beam with extremely small divergence and of observing an object with a high angular resolution. Such a laser radar device is used as a wind direction/speed radar. To calculate wind vectors, calculations are performed by the velocity azimuth display (VAD) method, vector operation or the like using the values of line-of-sight wind-speed in multiple directions.

An example of use applications of the laser radar devices is a feedforward control to detect arriving wind and perform pitch and yaw control in the laser radar device located on a wind turbine nacelle, as disclosed in the Patent Literature listed below. It can be considered that, in a wind-power plant (a wind farm), laser radar devices are installed in wind turbines to improve the power generation efficiency of each wind turbine, and maximize the total amount of electricity generated by wind power.

CITATION LIST

Patent Literature

Patent Literature 1: Japanese Patent Application Publication No. 2004-301116.

SUMMARY OF INVENTION

Technical Problem

However, if a lidar is installed behind blades of the wind turbine as described above, a situation occurs in which the blades shield the laser light of the lidar and thereby observation cannot be performed. Especially, when a wind speed is low or the wind turbine blade stops, such a situation continuously occurs. In order to calculate a wind direction/wind velocity (wind vector), it is required to obtain two or more values of line-of-sight wind-speeds in two or more lines of sight for two-dimensional observation or three or more lines of sight for three-dimensional observation. The wind vector therefore cannot be calculated when even one direction is shielded. Conventionally, only a way to cope with the shielded situation is to wait for the time when the shielding object is removed. Further, with laser radar devices which perform scanning with laser light while simply performing switching of laser light, it is required to wait for a direction of a sequence. For this reason, there is the problem that an effective data acquisition rate with respect to the wind vector is low. The effective data acquisition rate stands for the number of times the wind direction and speed can be calculated with respect to the number of trial and error to calculate the wind direction and speed. When the number of times the laser light is shielded by the shielding object is large, even if the calculation of the wind direction and speed is tried, the wind direction and speed cannot be calculated, so that the effective data acquisition rate becomes low. Namely, the low effective data acquisition rate indicates that data required for calculating the wind direction and speed is not acquired.

Solution to Problem

A data processing device of the present invention includes: a data communication device configured to communicate with a laser radar device to acquire a value of line-of-sight wind-speed, a laser emission angle, attitude information, position information, and a time; a storage device configured to store therein the value of line-of-sight wind-speed and the time; a central processing unit configured to run a data selector to thereby select the value of line-of-sight wind-speed stored in the storage device and being present within a set time period from a time about the value of line-of-sight wind-speed which is newly acquired by the data communication device, and configured to run a wind vector calculator to thereby calculate a wind vector using the value of line-of-sight wind-speed which is newly acquired by the data communication device, and using the value of line-of-sight wind-speed selected by the data selector; and a memory configured to store the data selector and the wind vector calculator.

Advantageous Effects of Invention

According to the present invention, because a wind vector calculation is performed based on the integration of the values of line-of-sight wind-speed measured by a plurality of laser radar devices, it is possible to gather data pieces that are free from loss due to shielding, and an effect can be achieved of avoiding a decrease in effective data acquisition rate due to a shielding object.

DESCRIPTION OF EMBODIMENTS

First Embodiment

In place of a conventional method in which a single laser radar device acquires a plurality of values of line-of-sight wind-speed, the present embodiment uses a method of uniformly managing and aggregating the values of line-of-sight wind-speed of data measured by a plurality of laser radar devices, and calculating a wind vector after checking whether the values of line-of-sight wind-speed are available, thereby improving an effective data acquisition rate. Note that, a plurality of values of line-of-sight wind-speed are required to calculate a wind vector. In contrast, conventionally, when a required number of values of line-of-sight wind-speed cannot be acquired because laser light is shielded, an effective data acquisition rate required for calculating the wind vector becomes low.

Figure 1:
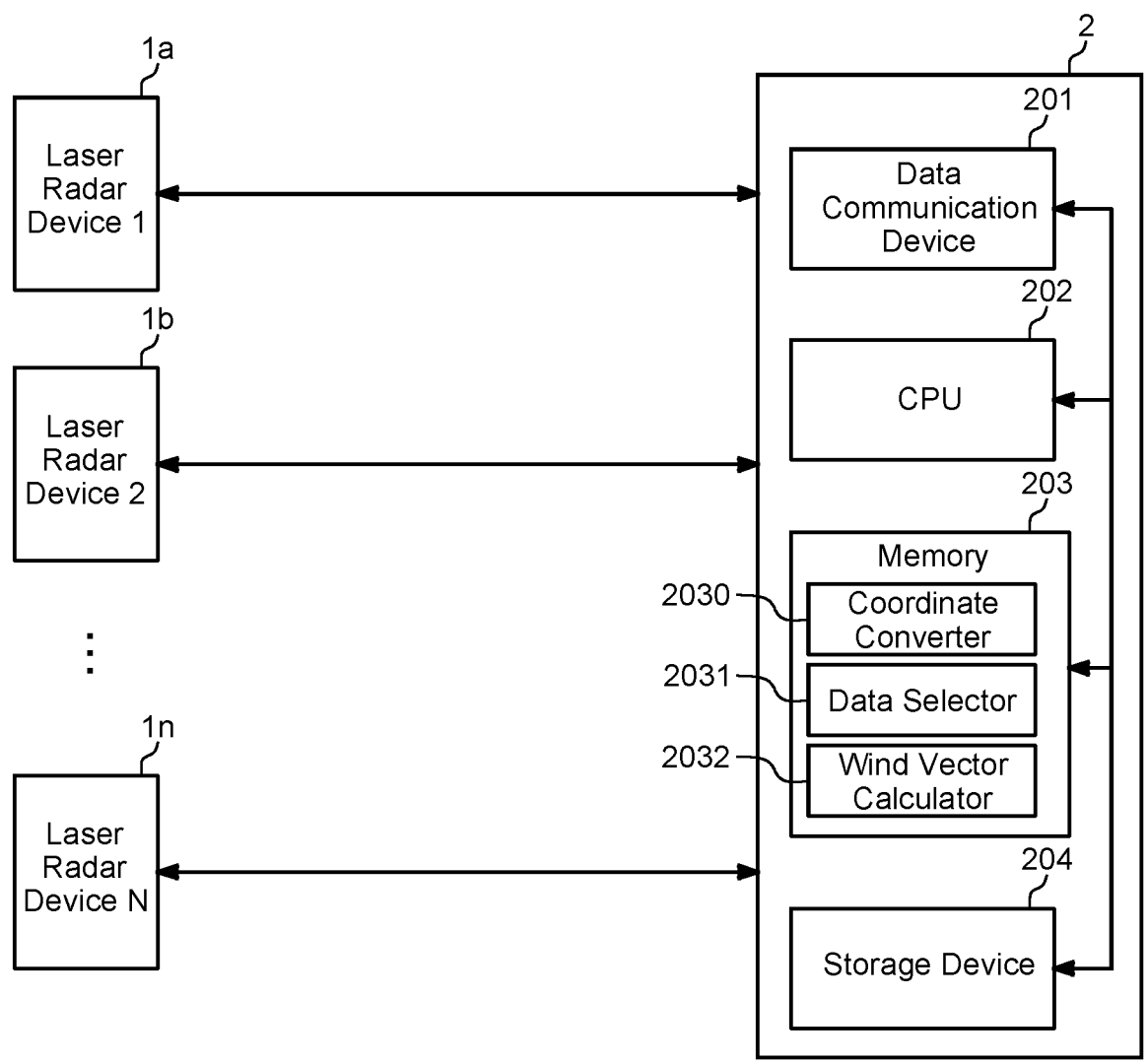
FIG. 1 is a configuration diagram illustrating a configuration example of a wind measurement system according to a first embodiment of the present invention.

FIG. 1 is a configuration diagram illustrating a configuration example of a wind measurement system according to a first embodiment of the present invention. This wind measurement system is provided with laser radar devices 1a to 1n and a data processing device 2.

Figure 2:
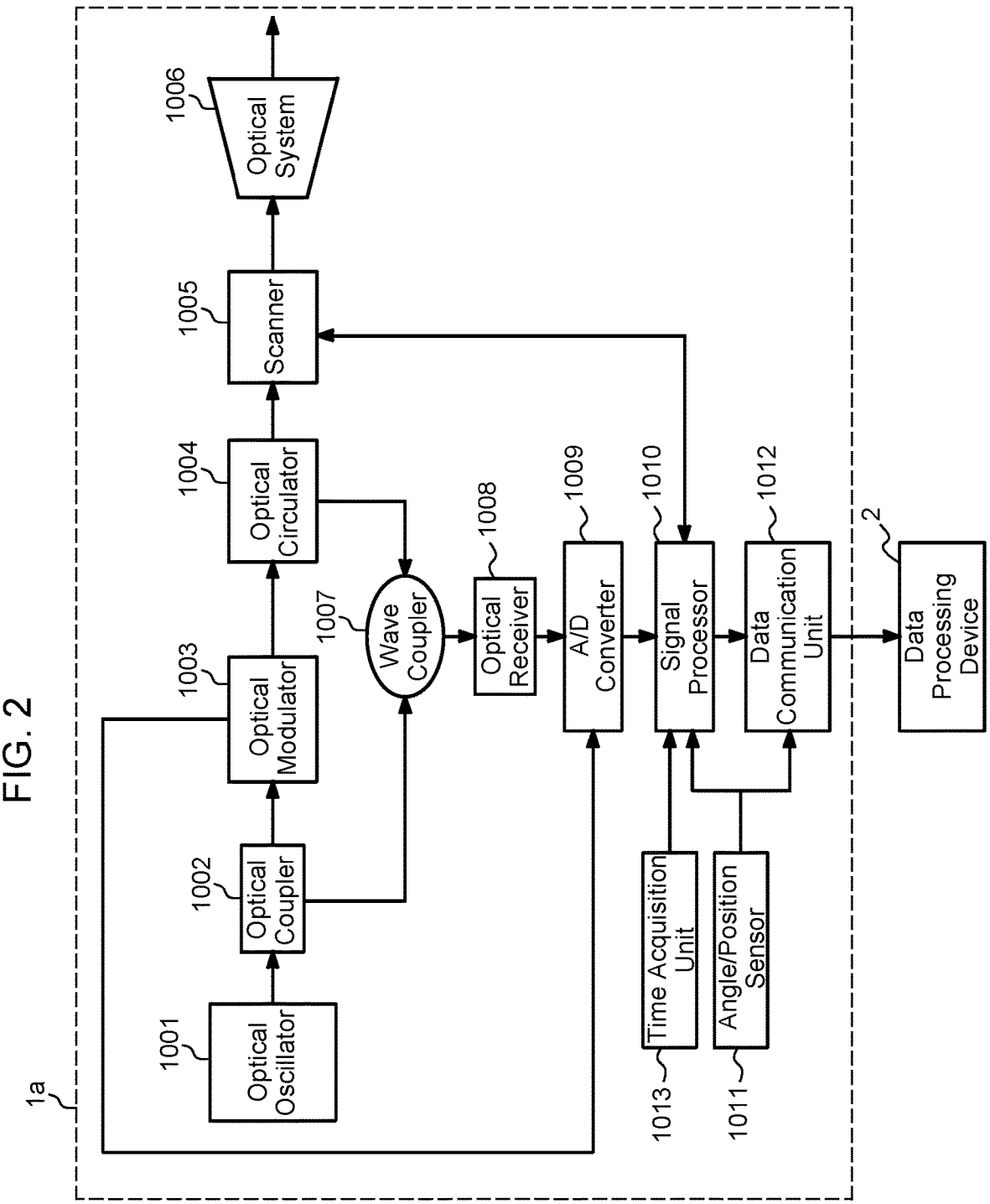
FIG. 2 is a configuration diagram illustrating a configuration example of a laser radar device according to the first embodiment of the present invention.

FIG. 2 is a configuration diagram illustrating a configuration example of the laser radar device according to the first embodiment of the present invention. The laser radar device 1a is provided with an optical oscillator 1001, an optical coupler 1002, an optical modulator 1003, an optical circulator 1004, a scanner 1005, an optical system 1006, a wave coupler 1007, an optical receiver 1008, an analog to digital converter (A/D converter) 1009, a signal processor 1010, an angle/position sensor 1011, a data communication unit 1012, and a time acquisition unit 1013.

The optical oscillator 1001 is an optical oscillator having a function of emitting laser light, which outputs the laser light to the optical coupler 1002, and is connected to other devices through the optical coupler by fusion bond or by means of an optical connector. Note that, although, hereinafter, an optical connecting method is described based on a fiber, a connecting method may also be a space propagation without using the fiber. For example, a semiconductor laser is used for the optical oscillator 1001.

The optical coupler 1002 is a divider which divides, at an arbitrary branching ratio, the light output by the optical oscillator 1001 into local light (light in a propagating direction toward the optical receiver) and transmission light (light in a propagating direction toward the optical modulator), in order to allow the optical receiver on a subsequent stage to perform heterodyne detection.

The optical modulator 1003 is an optical device which performs optical frequency modulation and optical intensity modulation on the laser light output by the optical coupler 1002. For example, an AO frequency shifter is used as the optical modulator 1003. Although this configuration is described on the premise of a pulse laser radar device, a continuous wave (CW) method may also be used. Also, when the output light is insufficient, an optical amplifier may be added to a subsequent stage following the acousto-optic (AO) effect frequency shifter.

The optical circulator 1004 is an optical circulator which separates transmission light obtained by the frequency modulation and received light acquired via the scanner 1005 and optical system 1006. The transmission direction is coupled to the optical system 1006, and the reception direction is coupled to the wave coupler 1007 by fusion bond or by means of an optical connector.

The scanner 1005 is a scanner capable of rotating at an arbitrary speed, which includes wedge prisms, a motor that rotates the wedge prisms, and an encoder, and outputs angle information to the signal processor 1010. For example, a stepping motor with an encoder is used as the motor of the scanner 1005. In addition to the scanner configuration described above, the configuration may be used which acquires values of wind speeds in multiple lines of sight by performing switching between optical paths by means of an optical switch, and connecting each optical path to an optical system having different lines of sight. In this case, for example, a mechanical optical switch, a micro-electro mechanical systems (MEMS) optical switch or the like, which are commonly used in communication, is used as the optical switch.

The optical system 1006 is an optical system which transmits the transmission light output by the scanner 1005 into the atmosphere, and receives scattered light from aerosol as received light. For example, an optical telescope is used as the optical system 1006.

The wave coupler 1007 is a wave coupler which multiplexes the local light output by the optical coupler 1002 and the received light output by the optical circulator 1004. As the wave coupler 1007, either a fusion-bond coupler or a filter coupler is used.

The optical receiver 1008 is an optical receiver which performs the heterodyne detection on the light multiplexed by the wave coupler 1007. For example, a balanced receiver is used as the optical receiver 1008.

The A/D converter 1009 is a converter which operates in synchronization with a laser pulse trigger signal output by the optical modulator 1003, and converts an analog electric signal output by the heterodyne detection in the optical receiver 1008, into a digital signal.

Figure 3:
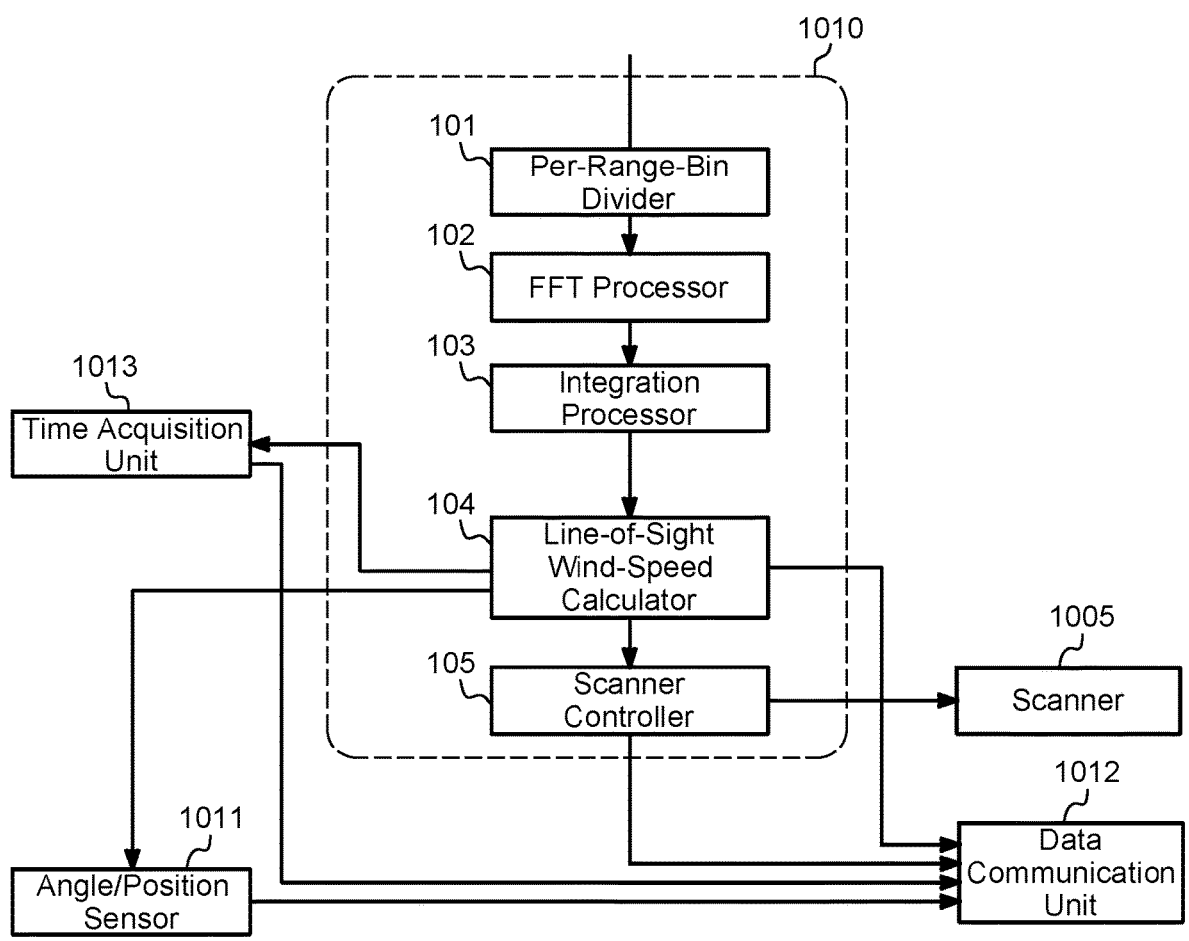
FIG. 3 is a configuration diagram illustrating a configuration example of a signal processor 1010 according to the first embodiment of the present invention.

FIG. 3 is a configuration diagram illustrating a configuration example of the signal processor 1010 according to the first embodiment of the present invention.

The signal processor 1010 is provided with a per-range-bin divider 101, a fast Fourier transform (FFT) processor 102, an integration processor 103, a line-of-sight wind-speed calculator 104, and a scanner controller 105.

For example, the signal processor 1010 is comprised of a field-programmable gate array (FPGA), an application specific integrated circuit (ASIC), a microcomputer and/or the like. The per-range-bin divider 101, the fast Fourier transform (FFT) processor 102, the integration processor 103, the line-of-sight wind-speed calculator 104, and the scanner controller 105 may be comprised of a logic circuit of the FPGA or ASIC, and/or their respective functions may be implemented by software.

The per-range-bin divider 101 is a per-range-bin divider which performs an operation to separate a digital received signal output by the A/D converter 1009 for each predetermined time range (range bin) and outputs the received signal separated for each range bin to the FFT processor 102.

The FFT processor 102 is a FFT processor which performs Fourier transform of the received signal of each range bin output by the per-range-bin divider 101, and outputs the converted signal in the form of a spectrum, to the integration processor 103.

The integration processor 103 is an integration processor which integrates spectrum signals output by the FFT processor 102 for each range bin, and outputs an integrated spectrum to the line-of-sight wind-speed calculator 104.

The line-of-sight wind-speed calculator 104 calculates a Doppler wind speed value, that is, a value of line-of-sight wind-speed, from the integrated spectrum obtained by the integration processor 103, outputs an electric signal indicating termination of the calculation to the time acquisition unit, the angle/position sensor, and the scanner controller, and outputs the calculated value of line-of-sight wind-speed to the data communication unit 1012.

The scanner controller 105 is a scanner controller which receives the electric signal indicating the termination of the calculation operation of the line-of-sight wind-speed calculator 104, transmits the angle information for switching between lines of sight to the scanner 1005, and transmits the angle information of the scanner indicating a radiation angle of the laser light to the data communication unit 1012.

The angle/position sensor 1011 is a sensor which receives the electric signal indicating the termination of the calculation of the line-of-sight wind-speed calculator 104, and outputs attitude angle information and position information of the laser radar device at that time. For example, the angle/position sensor 1011 is comprised of a gyro sensor and a global positioning system (GPS) module.

The data communication unit 1012 is a data communication unit which transmits the value of line-of-sight wind-speed output by the line-of-sight wind-speed calculator 104, the attitude angle information output by the angle/position sensor 1011, the angle information of the scanner 1005 output by the scanner controller 105, and the time information output by the time acquisition unit 1013. For example, the data communication unit 1012 is comprised of a communication device such as a wired or wireless local area network (LAN) device, Bluetooth (registered trademark), or universal serial bus (USB).

The time acquisition unit 1013 is a time acquisition unit which outputs times to the data communication unit 1012 in response to the signal indicating the termination of the calculation operation output by the line-of-sight wind-speed calculator 104. For example, a GPS receiver is used as the time acquisition unit 1013.

As illustrated in FIG. 1, the data processing device 2 is provided with a data communication device 201, a central processing unit (CPU) 202, a memory 203, and a storage device 204.

The data communication device 201 is a data receiver device which receives the value of line-of-sight wind-speed, its signal-to-noise ratio (SNR), the attitude-angle and position information of the laser radar device, the angle information of the scanner and the time information, from the laser radar devices 1a to 1n. Also, the data communication device 201, which is connected to a wind turbine control device, outputs the wind vector information of a requested position. For example, a communication device such as a wired or wireless LAN device, Bluetooth, or USB is used as the data communication device 201.

The CPU 202 is a processor which executes a program stored in the memory 203.

The memory 203 is a memory which stores the program to be executed by the CPU 202. The memory 203 stores a coordinate converter 2030, a data selector 2031, and a wind vector calculator 2032. The coordinate converter 2030, the data selector 2031, and the wind vector calculator 2032 are programs and are executed by the CPU 202.

The storage device 204 is a storage device which stores data processed by the CPU 202 as a database. The storage device 204 stores the values of line-of-sight wind-speed, the SNR thereof, the irradiation angle of the laser light, the attitude angle information (acquired attitude angle of the laser radar device), a measurement position (acquired position of the laser radar device), and acquisition time. The values of line-of-sight wind-speed are stored in accordance with an earth coordinate system such as north, south, east, and west. For example, a random access memory (RAM), a hard disk and the like is used as the storage device 204.

Next, operations of the wind measurement system according to the first embodiment of the present invention is described. First, an operation of the laser radar device 1a is described, and then an operation of the data processing device 2 is described.

The optical oscillator 1001 outputs the laser light to the optical coupler 1002.

The optical coupler 1002 divides the light output from the optical oscillator 1001 into the local light and the transmission light at an arbitrary branching ratio for performing the heterodyne detection by the optical receiver 1008. The branching ratio is determined by a system design. For line calculation for the system design, for example, the following equation is used.

[Mathematical Expression 1]

$$SNR = P \cdot \beta \cdot K \cdot \frac{\eta_F}{\left(1 + \left(1 - \frac{L}{F}\right)^2 \left[\frac{\pi(A_c D)^2}{4\lambda L}\right]^2 + \left(\frac{A_c D}{2S_0}\right)^2\right)} \cdot \left[\frac{\lambda \pi D^2}{8 h B L^2}\right] \sqrt{N} \quad (1)$$

Here, $\beta$, K, and $S_0$ represent a backscattering coefficient ($m^{-1} sr^{-1}$), atmospheric permeability, and a coherence diameter (m) of the scattered light, respectively, and represent parameters indicating atmospheric conditions which cannot be controlled by the system. D (m), F (m), and N (times) represent a beam diameter, a condensing distance, a pulse width, and an incoherent integration number, respectively, and represent parameters which may be changed in the system. Note that h, $\lambda$, P, $\eta F$, and B represent a Planck's constant (Js), a wavelength (m), transmission light pulse energy (J), transmission/reception efficiency of Far Field, and a reception bandwidth (Hz), respectively. "Ac" represents an approximation coefficient for replacing a nearest Gaussian beam (NGB) vignetted by an optical antenna with a diffraction-limited Gaussian beam having a high correlation therewith, and "L" represents an observation distance (m).

The optical modulator 1003 performs optical frequency modulation and optical intensity modulation on the transmission light output by the optical coupler 1002, and outputs the modulated transmission light to the optical circulator 1004. Also, the optical modulator 1003 determines the pulse width and repetition frequency (PRF) of the laser light to be transmitted. Because the pulse width corresponds to a distance resolution, it is possible to set the pulse width allowing for a desired distance resolution value in the signal processor 1010, or to output the fixed pulse width and PRF that are set at design stage.

The optical circulator 1004 having a function of separating the transmission light and the received light outputs the transmission light modulated by the optical modulator 1003 to the scanner 1005 and outputs the scattered light from the atmospheric aerosol as the received light to the wave coupler 1007.

The scanner 1005 receives a control signal output from the signal processor 1010, rotates the wedge prism, and arbitrarily changes a direction of the light emitted by the optical system 1006. Also, the electric signal corresponding to encoder information is output to the signal processor 1010, and the angle information is transmitted.

The optical system 1006 collimates the transmission light output by the scanner 1005, outputs the same into the atmosphere, and receives the light scattered by the aerosol in response to the transmission light as the received light. The optical system 1006 outputs the received light to the optical circulator 1004. Note that the optical system 1006 may also have a condensing adjusting function.

The wave coupler 1007 multiplexes the local light output by the optical coupler 1002 and the received light output by the optical circulator 1004, and outputs the multiplexed light to the optical receiver 1008.

The optical receiver 1008 performs photoelectric conversion on the light output by the wave coupler, performs frequency demodulation of the received light by the heterodyne detection, and outputs the electric signal to the A/D converter 1009.

The A/D converter 1009 performs the A/D conversion at a sampling frequency fs in synchronization with the pulse trigger signal generated by the optical modulator 1003, and outputs the digital signal to the signal processor 1010.

Figure 4:
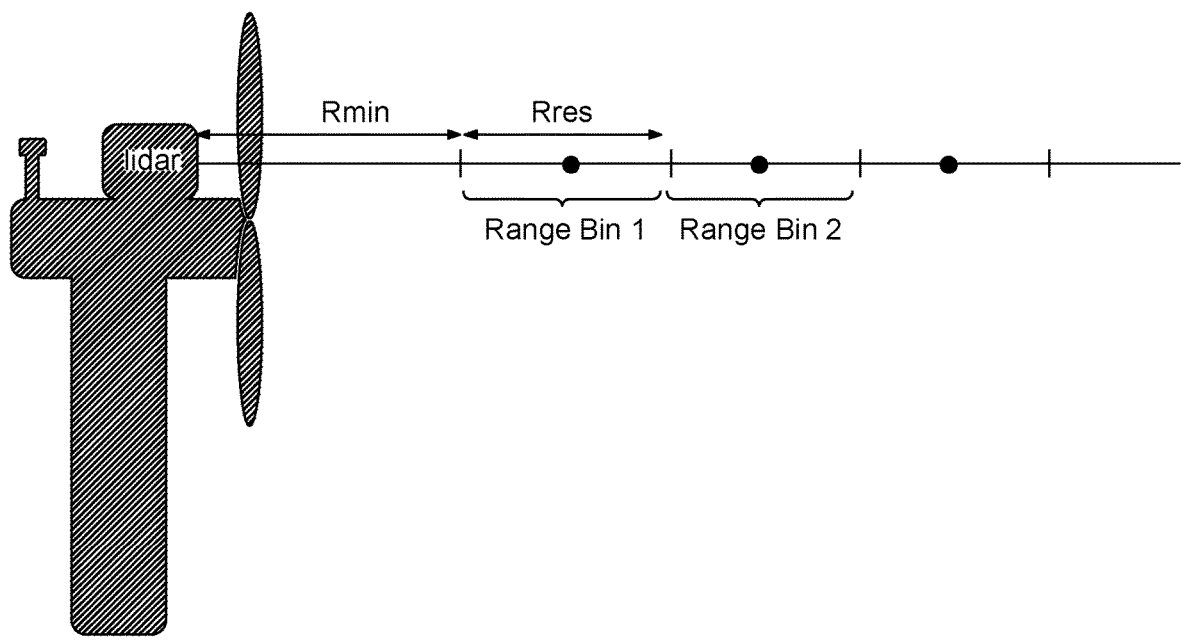
FIG. 4 is an illustrative view illustrating a range bin divided by a per-range-bin divider 101 according to the first embodiment of the present invention.

FIG. 4 is an illustrative view illustrating the range bin divided by the per-range-bin divider 101 according to the first embodiment of the present invention.

The per-range-bin divider 101 separates the digital signal output by the A/D converter 1009 by an arbitrary time width. This means that the received light from each distance is separated by an arbitrary time width. Since time and distance correspond to each other, in the following, the substance acquired by separating the time, that is, by separating the distance is referred to as the range bin. The per-range-bin divider 101 separates a reception waveform into an arbitrary number of range bins and outputs a voltage value corresponding thereto to the FFT processor 102. For example, when distance resolution Rres is set to 30 m, it is possible to set such that a time width t for separating the A/D converted time waveform=2 Rres/c (c: light speed). Therefore, when the total number of range bins is M, the time separated by each range bin is expressed by the following equations based on a trigger for starting A/D, herein, a trigger signal timing from the optical modulator 1003. However, although the range bin is herein divided at regular time intervals, there is no limitation and an observation starting distance corresponding to Tstart may be determined by a user, this may be set for each range bin, or ranges of Tstart and Tend may be overlapped with each other.

[Mathematical Expression 2]

$$Tstart(m) = (m-1)\left(\frac{2Rres}{c}\right) + 2Rmin/c \quad (2)$$

[Mathematical Expression 3]

$$Tend(m) = (m+1)\left(2\frac{Rres}{c}\right) + 2Rmin/c \quad (3)$$

[Mathematical Expression 4]

$$Tcen(m) = (m)\left(\frac{2Rres}{c}\right) + 2Rmin/c \quad (4)$$

Tstart represents data acquisition start time of each range bin, Tend represents data acquisition end time of each range bin, and m represents a range bin number having values of 1 to M. Rmin represents a value for adjustment and is a parameter for specifying an observation minimum distance.

The FFT processor 102 performs the fast Fourier transform on the time waveform of each range bin output by the per-range-bin divider 101 to acquire the spectrum for the received signal for each range bin.

Figure 5:
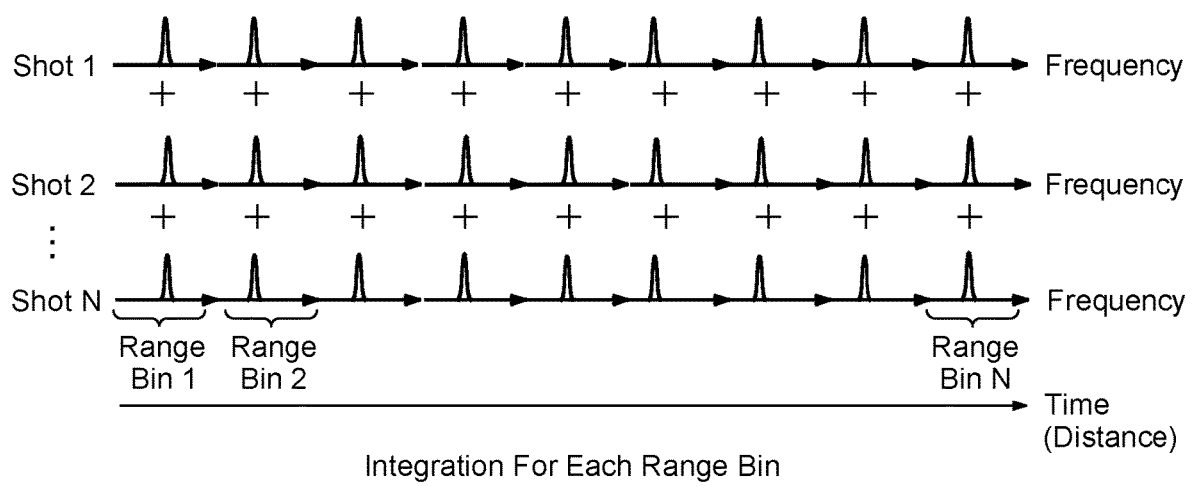
FIG. 5 is a conceptual diagram illustrating an integration operation of an integration processor 103 according to the first embodiment of the present invention.

FIG. 5 is a conceptual diagram illustrating an integration operation of the integration processor 103 according to the first embodiment of the present invention.

The integration processor 103 performs the integration operation the number of times specified by the user for each range bin. Incoherent integration is performed on the spectrum acquired in each shot. The integration operation is performed on spectral data of each range bin by the following equation.

[Mathematical Expression 5]

$$S(i, R) = \left(\sum_{j}^{N} SPC(i, j, R)\right)/N \quad (5)$$

"SPC" represents the spectral data, "i" represents a frequency bin number, that is, the number indicating order in the data arranged in frequency order, "i" represents a shot number, and "R" represents a range bin number.

The line-of-sight wind-speed calculator 104 calculates a Doppler frequency in the line of sight, that is, the value of line-of-sight wind-speed from the integrated spectrum and outputs the calculated value of wind speed, and its SNR to the data communication unit 1012. To derive the Doppler frequency, in addition to detection by spectrum peak detection, center-of-mass arithmetic operation may also be used. The calculation of a Doppler frequency fd by the center-of-mass arithmetic operation is expressed by the following equation. Herein, S(f) represents the spectrum of the received signal for a certain range bin (R), and S(f)=S(i,R) is satisfied. f represents a frequency corresponding to each frequency bin number (i). By weighting the reception spectrum with the frequency f, it is possible to calculate the center-of-mass point, and it is possible to derive the value of wind speed beyond the frequency resolution.

[Mathematical Expression 6]

$$Fd = \frac{\int S(f)f}{\int S(f)}$$ (6)

Also, after the calculation is terminated, the line-of-sight wind-speed calculator 104 outputs the electric signal indicating the termination of the calculation to the angle/position sensor 1011, the scanner controller 105, and the time acquisition unit 1013. Although this is output after the calculation is terminated, this may also be output before the calculation starts or when the integration operation is started by the integration processor 103 on an upper stage. Alternatively, an average value of the angle/position acquired in a time period during the integration may be transmitted to the data processing device 2, and there is no limitation.

The scanner controller 105 generates a control signal for controlling the angle of the scanner 1005 in order to switch the line of sight of the transmission light. Upon receiving the signal indicating the calculation termination output by the line-of-sight wind-speed calculator 104, the scanner controller 105 transmits the angle of the scanner 1005 when the laser light is applied for calculating the value of line-of-sight wind-speed to the data communication unit 1012.

The scanner 1005 changes an angle of a mirror (or a wedge prism) by driving the stepping motor in the scanner by the control signal of the scanner controller 105 and allowing the same to perform a desired step operation. Also, an angle signal by the encoder mounted thereon is transmitted to the scanner controller 105, and the scanner controller 105 holds the angle information after the operation. The angle corresponds to an ideal angle $\varphi$ or the like to be described later.

Figure 6:
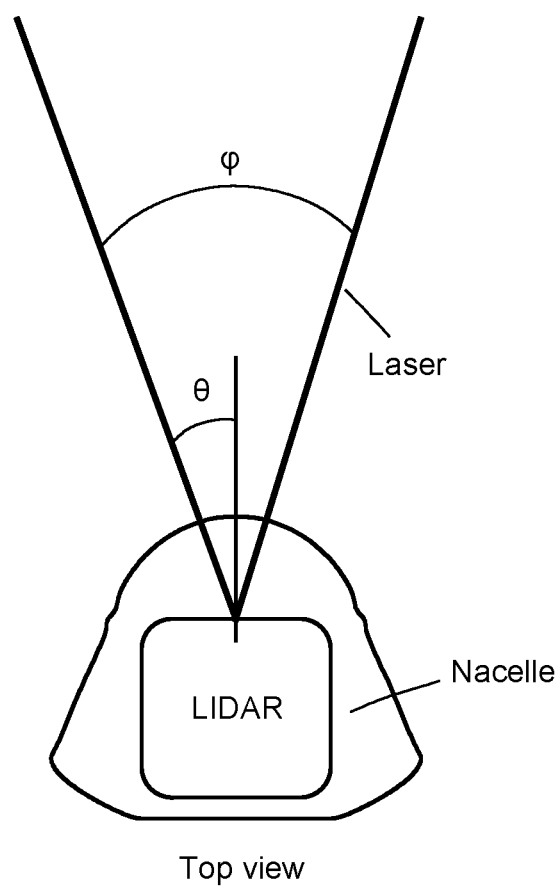
FIG. 6 is a conceptual diagram illustrating an opening angle of laser light controlled by a scanner 1005 according to the first embodiment of the present invention.

FIG. 6 is a conceptual diagram illustrating an opening angle of the laser light controlled by the scanner 1005 according to the first embodiment of the present invention. As illustrated in FIG. 6, the angle is such that the laser light is applied at an one-side angle $\theta$ and in a horizontal direction with respect to the ground. $\varphi$ represents the opening angle between the two laser lights. The scanner controller 105 outputs the control signal to switch the laser light to left, right, and left to the scanner 1005.

Upon receiving the signal indicating the calculation termination output by the line-of-sight wind-speed calculator 104, the angle/position sensor 1011 outputs the angle and position of the laser radar device at the time of reception to the data communication unit 1012. Note that, as the angle/position sensor 1011, for the angle sensor, a sensor capable of acquiring shaking and translation with a six-axis degree of freedom such as a gyro sensor, a sensor capable of acquiring an elevation angle EL, an azimuth angle AZ from the north, and east-west, north-south, and vertical translation is used. For the position sensor, a sensor capable of knowing latitude and longitude such as a GPS and a sensor capable of acquiring an UTM coordinate system are used.

Upon receiving the signal indicating the calculation termination output by the line-of-sight wind-speed calculator 104, the time acquisition unit 1013 acquires the time from a GPS satellite and outputs the time at the time of reception to the data communication unit 1012. Note that, although the GPS sensor is used as the time acquisition unit 1013, a network time protocol (NTP) may also be used as long as time synchronization is possible.

The data communication unit 1012 transmits the above-described value of line-of-sight wind-speed, the time and SNR associated therewith, the attitude angle of the laser radar device, the position of the laser radar device, and the radiation angle of the laser light to the data processing device 2. A transmitting method may be a wired method such as an optical cable, or a wireless method such as Bluetooth and Wi-Fi.

Next, the operation of the data processing device 2 is described.

Figure 7:
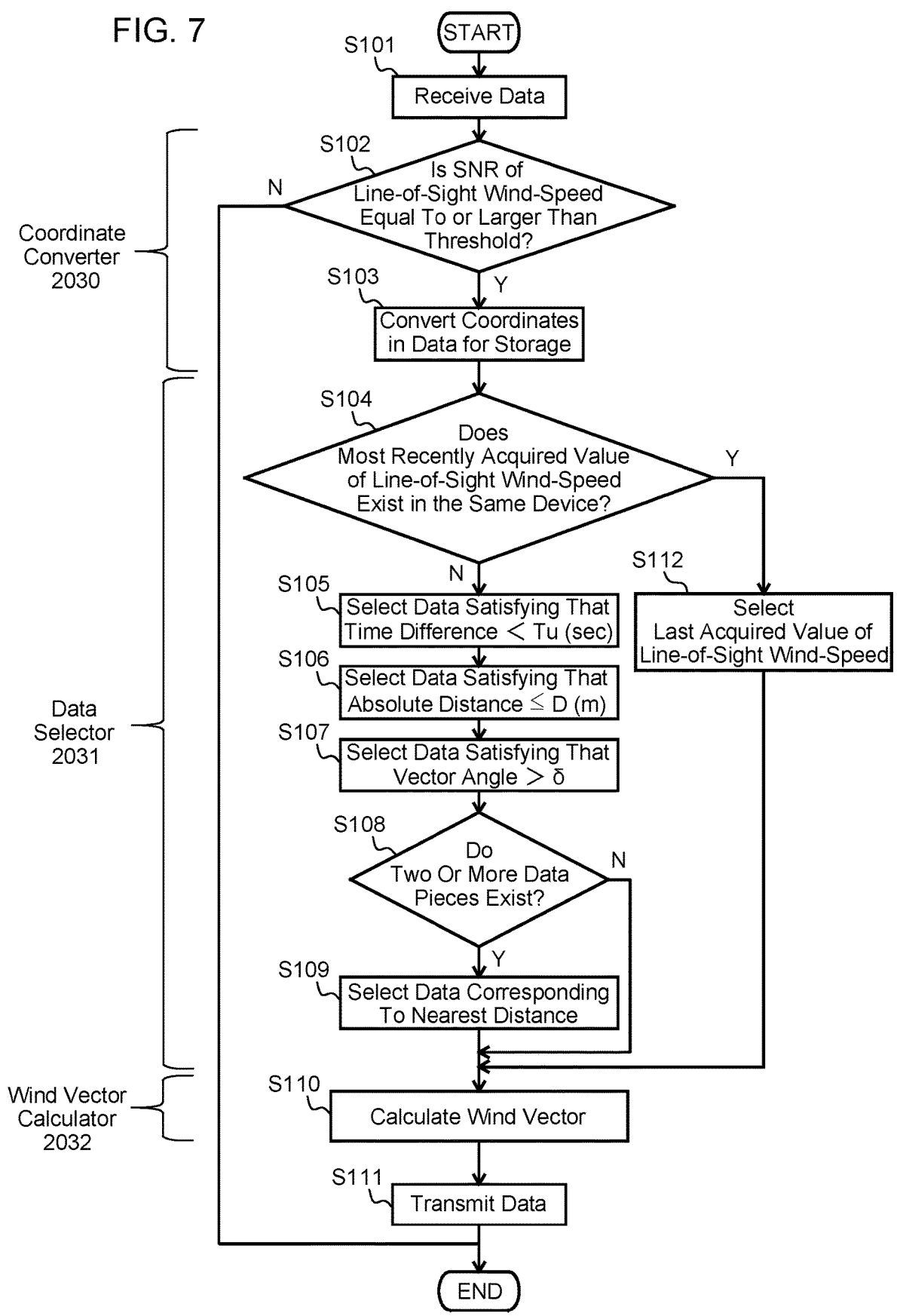
FIG. 7 is a flowchart illustrating an operation flow of a data processing device 2 according to the first embodiment of the present invention.

FIG. 7 is a flowchart illustrating an operation flow of the data processing device 2 according to the first embodiment of the present invention.

At step S101, the data communication device 201 in the data processing device 2 receives the information transmitted by the data communication unit 1012 of the laser radar device 1a. Note that the data communication device 201 forms a pair with the data communication unit 1012 in the laser radar device 1a described above; for example, when Bluetooth is used, the data communication device 201 also uses Bluetooth.

At step S102, the CPU 202 reads out the coordinate converter 2030 stored in the memory 203 to run. The coordinate converter 2030 determines whether the SNR associated with the value of line-of-sight wind-speed is equal to or larger than a threshold Ts. When this is equal to or larger than Ts, the procedure shifts to step S103 by branching to YES. When this is smaller than Ts, the procedure shifts to END by branching to NO and the data smaller than the threshold is not stored.

At step S103, the coordinate converter 2030 performs the following calculation to convert coordinates of the data. In the received data, an observation center distance value Ds in the line of sight of each range bin is expressed by the following equation.

[Mathematical Expression 7]

$$Ds(m) = (m-1) \times Rres + (Rres/2 + Rmin)$$ (7)

The coordinates (XL,XL,ZL) of each observation point based on the laser radar device 1a are expressed by the following equations. In the following equations, $0° < AZ < 180°$ is satisfied.

[Mathematical Expression 8]

$$XL = Ds(m) \times \sin(AZ+\varphi)(EL)$$ (8)

[Mathematical Expression 9]

$$YL = Ds(m) \times \cos(AZ+\varphi)\cos(EL)$$ (9)

[Mathematical Expression 10]

$$ZL = Ds(m) \times \sin(EL)$$ (10)

Herein, XL, YL, and ZL represent a right and left direction, a front and rear direction, and a vertical direction with respect to the orientation of the laser radar device 1a, H represents a height of the laser radar device 1a from the ground, AZ represents the azimuth angle of the laser radar device 1a acquired by the angle/position sensor 1011, and EL represents the elevation angle of the laser radar device 1a. $\varphi$ represents the radiation angle of the laser light.

When east-west, north-south, and vertical universal transverse mercator (UTM) coordinates of a wind farm in which the laser radar devices 1a to 1n are installed are set to (Xuw,Yuw,Zuw), and the UTM coordinates of the laser radar device 1a acquired from the angle/position sensor 1011 are set to (Xul,Yul,Zul), a measurement position of each range bin (X,Y,Z) is expressed by the following equations.

[Mathematical Expression 11]

$$X(m,t,AZ,EL,l)=Xul-Xuw+XL \quad (11)$$

[Mathematical Expression 12]

$$Y(m,t,AZ,EL,l)=Yul-Yuw+YL \quad (12)$$

[Mathematical Expression 13]

$$Z(m,t,AZ,EL,l)=Zul-Zu+ZL \quad (13)$$

Herein, l represents a laser radar device number. When there is no shaking component in a nacelle of the wind turbine, EL=0 is basically satisfied, but by adding the same as a term, angle correction based on the shaking of the nacelle is also possible.

The coordinate converter 2030 performs the above-described calculation and stores a value of line-of-sight wind-speed v(t, AZ, EL) of each range bin in the storage device 204 in association with the measurement point X, Y, Z. As a result, in the storage device 204, the value of line-of-sight wind-speed v corresponding to the time t, and the measurement point X, Y, Z is stored as the database. Herein, the value of line-of-sight wind-speed v is a vector amount a direction of which is represented by the azimuth angle AZ and the elevation angle EL.

As described below, in order to calculate a two-dimensional wind vector, two values of line-of-sight wind-speed are necessary, and they must be vector-composed. Therefore, in addition to the value of line-of-sight wind-speed received at step S101, at least another data is required. The data selector 2031 searches for data suitable for calculating the wind vector.

At step S104, the data selector 2031 checks whether there is the value of line-of-sight wind-speed acquired by immediately preceding laser emission satisfying a desired SNR in the laser radar device which transmits the data received at step S101. This is because, for calculating the wind vector, when the laser light of the laser radar device 1a is not blocked by a blade of the wind turbine or the like, the wind vector calculation is performed only with the data thereof as in the conventional manner. When there is no value, the procedure shifts to step S105 by branching to NO. When there is the value, the procedure shifts to step S112 by branching to YES. The following branching to NO is described.

At step S105, the data selector 2031 selects, from among data stored in the storage device 204, data measured within Tu (sec) for the data received at step S101. Note that, As Tu, a value determined by the user may be used, or it is also possible to provide a condition equation such that, when turbulence intensity (TI: a value obtained by dividing a standard deviation of horizontal values of wind speed by an average value of wind speed) measured in the past is not larger than an arbitrary value, a wind speed field (flows of wind) is uniform.

At step S106, the data selector 2031 selects, from among data selected at step S105, data satisfying that the distance measured with respect to data received at step S101 is within D (m), where $D=\sqrt{(X^2+Y^2+Z^2)}$. Note that, as described above, a threshold operation may be performed using an absolute distance between two points in three-dimensional space, and a threshold may be provided for each of X, Y, and Z directions.

Figure 8:
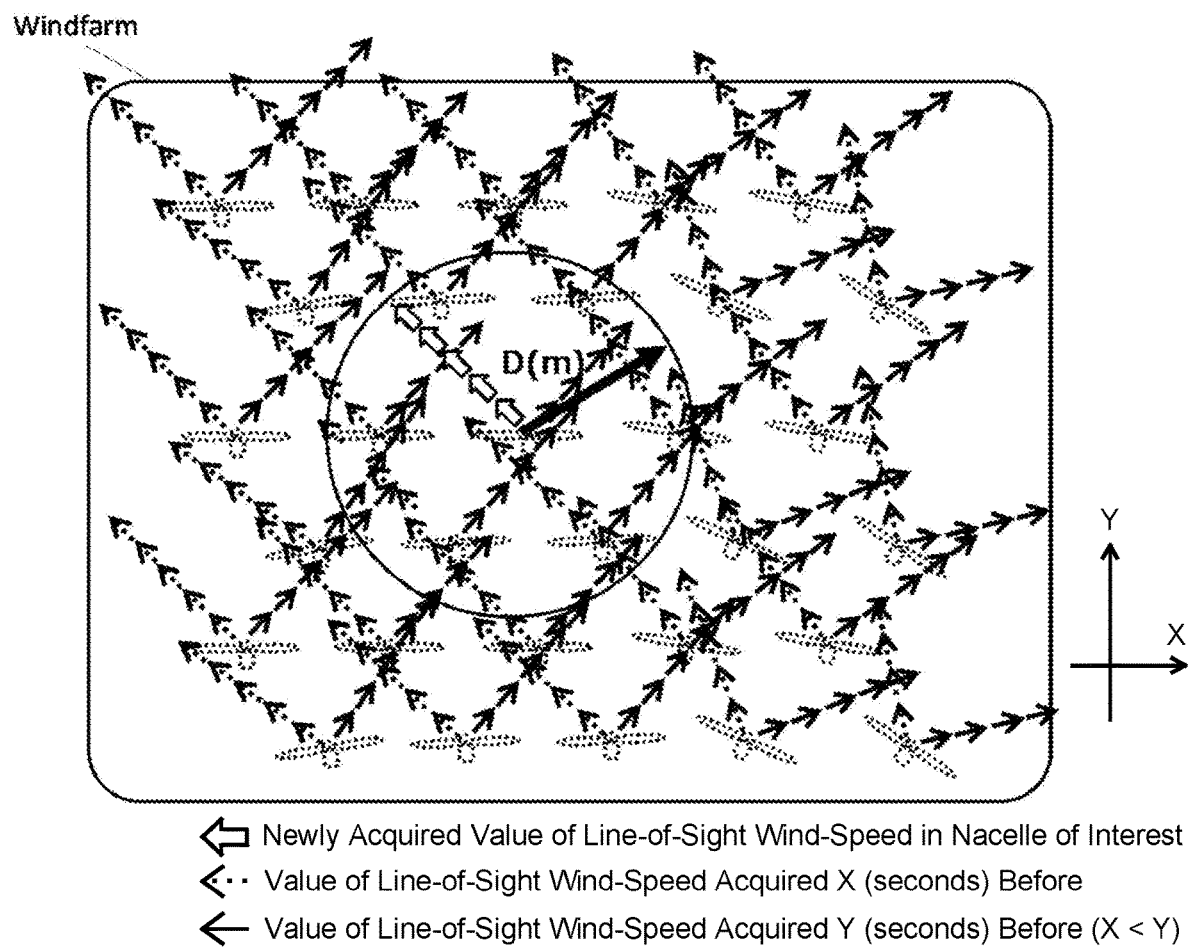
FIG. 8 is a conceptual diagram illustrating an environment in which the laser radar device is mounted on a nacelle of a plurality of wind turbines in a wind farm according to the first embodiment of the present invention.

FIG. 8 is a conceptual diagram illustrating an environment in which the laser radar device is mounted on the nacelle of a plurality of wind turbines in the wind farm according to the first embodiment of the present invention. In the present embodiment, the environment as in FIG. 8 is assumed. In FIG. 8, a "nacelle of interest" represents the nacelle on which the laser radar device as an output source of a most recently acquired value of line-of-sight wind-speed is mounted. A solid arrow indicates the value of line-of-sight wind-speed X (sec) before the time corresponding to the value of line-of-sight wind-speed measured by the laser radar device of the nacelle of interest, and a dotted line indicates the value of line-of-sight wind-speed Y (sec) before. At step S106, data measured by the laser radar device within D (m) from the nacelle of interest is selected.

At step S107, the data selector 2031 selects data having an angle of the value of line-of-sight wind-speed larger than an arbitrary angle δ on an X-Y plane with respect to the data received at step S101 out of the data selected at step S106. Φ being an original emission angle of the laser radar device may be set as a threshold or it is further set to φ+α in consideration of yaw motion of the nacelle to provide likelihood.

Ideally, when the same point is measured completely at the same time, and as the formed angle is closer to 90 degrees, measurement accuracy of the wind vector is improved. However, difference actually occurs, and as time elapses and as a space is farther, the wind vector changes, so that the thresholds described at steps S105 to S107 are provided. Each of the thresholds may be set in real time from the turbulence intensity or the user may provide an empirical value. For example, when change in altitude is more noticeable than horizontal change of the wind speed, by setting a strict value in the altitude direction and setting a loose threshold in the horizontal direction, it is possible to secure usable data and ensure accuracy of the wind vector.

At step S108, the data selector 2031 discriminates whether there are two or more data satisfying the conditions at steps S105 to S107. When there are two or more, the procedure shifts to step S109 by branching to YES. When there is less than two, the procedure shifts to step S110 by branching to NO.

At step S109, the data selector 2031 selects the data having the shortest distance to the data received at step S101 out of the data selected in the processes up to step S107. This is in consideration of a possibility that spatial uniformity directly connects to accuracy the most with a low processing cost in mind. However, this may be made the time or the angle. Also, it is possible to provide a plurality of conditions such that the distance is the shortest, time lag is the smallest, and the angle difference is the closest to 90 degrees.

At step S110, the wind vector calculator 2032 calculates the wind vector by the vector composition method or velocity azimuth display (VAD) method using the data received at step S101, and using the data selected at step S109 or data selected at step S112 as described later, and transmits the calculated wind vector to the data communication device 201. When calculating the wind vector from the two sets of value data of line-of-sight wind-speed, the value of line-of-sight wind-speed v is expressed by the equation as shown below, with a horizontal value of wind speed U in the east-west direction, a horizontal value of wind speed V in the north-south direction, an elevation angle θ, and an azimuth angle φ with reference to the north, so that the horizontal value of wind speed U and the horizontal value of wind speed V can be calculated by solving simultaneous equations which are based on the two values of line-of-sight wind-speed. In this manner, the two-dimensional wind vector is acquired. The storage device 204 stores the acquired wind vector.

[Mathematical Expression 14]

$$v=U \sin \varphi \sin \theta + V \cos \varphi \sin \theta \quad (14)$$

However, in this case, since this is the value of wind speed on the plane formed of the vector of the two values of line-of-sight wind-speed, when EL=0 is not satisfied, this is not the horizontal value of wind speed and has an error, so that it is desirable to calculate the wind direction and speed using the values of line-of-sight wind-speed three or more lines of sight in order to improve accuracy.

When calculating the wind vector from three value data pieces of line-of-sight wind-speed, since the value of line-of-sight wind-speed v is expressed by the following equation, by solving the simultaneous equations as in the case of two, the horizontal value of wind speed U, the horizontal value of wind speed V, and the value of wind speed W in the vertical direction may be calculated. In this manner, the three-dimensional wind vector is acquired.

[Mathematical Expression 15]

$$v=U \sin \varphi \sin \theta + V \cos \varphi \sin \theta + W \cos \theta \quad (15)$$

At step S111, the data communication device 201 transmits the calculated wind vector to the laser radar device 1a which transmits the data received at step S101 and finishes the flow.

On the other hand, at step S112, the data selector 2031 selects the data previously acquired by the laser radar device which transmits the data received at step S101 out of the data stored in the storage device 204. The selected data is used to calculate the wind vector at step S110 as described above.

The laser radar device 1a outputs the wind vector acquired from the data processing device 2 to the wind turbine control device or its own display. When outputting to the wind turbine control device, it is possible to perform control such as yaw control or pitch control of the wind turbine based on the wind vector, thereby contributing to improvement in wind power generation amount.

A case has been described in which the wind vector is output from the laser radar device to the wind turbine control device. Instead, it is also possible to output from the data processing device 2 directly to the wind turbine control device. Also, as the storage device 204, the memory 203 may be used.

Note that when calculating wind vector with two lines of sight, in addition to the threshold for the SNR, a threshold Te for the EL may be added at step S102. In order to detect arriving wind and maximize the wind power generation amount by controlling the wind turbine, the value of wind speed in the horizontal direction is the most important. Therefore, outputting the value of wind speed of a cross-section which is not horizontal might conversely decrease the wind power generation amount. Therefore, setting the threshold for the EL has an effect of solving this problem.

Also, in the present embodiment, for convenience of description, the number of laser light to be applied is two on the horizontal plane, but it is also possible to increase the number of emissions and apply in the vertical direction. In this case, not only the wind vector in the center of the nacelle but also the three dimensional wind vector in the vertical direction may be acquired, so that the wind turbine control with higher wind power generation efficiency becomes possible.

As is clear from the above description, according to the first embodiment of the present invention, the wind vector is calculated by using not only the value of line-of-sight wind-speed of the host laser radar device but also the value of line-of-sight wind-speed measured by another laser radar device, so that there is an effect of improving the effective data acquisition rate which is conventionally reduced due to the shielding of the laser light by a shielding object such as the blade of the wind turbine. Also, time is required to switch the beam with the single laser radar device, but in this method, it is also possible to perform a wind vector arithmetic operation using the values of line-of-sight wind-speed acquired at the same time. This has the effect of improving wind speed measurement accuracy.

Second Embodiment

In the present embodiment, in contrast to the first embodiment in which the wind vector is calculated by the data processing device, a method is such that a laser radar device requests a value of line-of-sight wind-speed from a data processing device and a wind vector is calculated by the laser radar device, so that a load of the data processing device is reduced and a wind vector calculation time is reduced.

Figure 9:
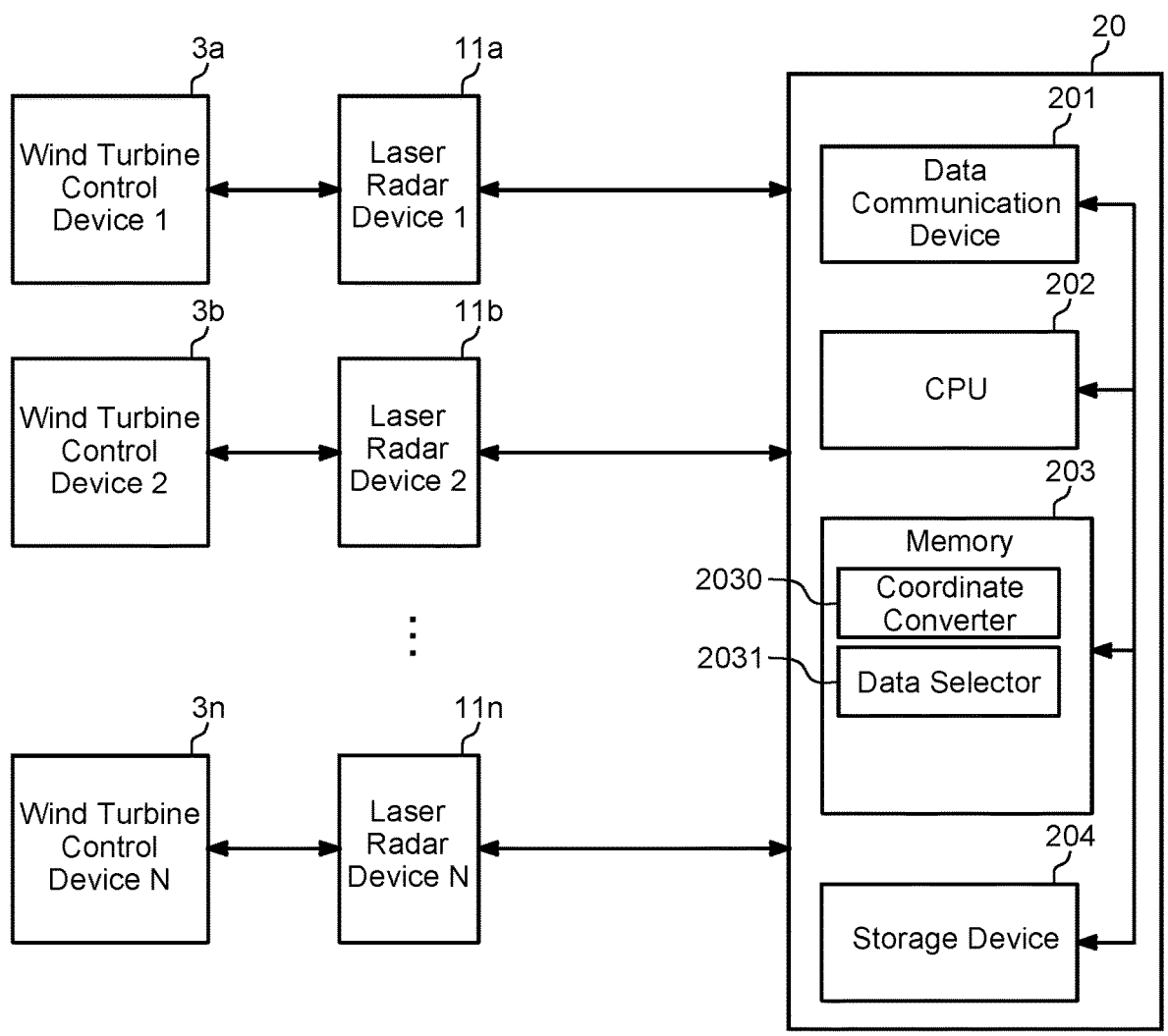
FIG. 9 is a configuration diagram illustrating a configuration example of a wind measurement system according to a second embodiment of the present invention.

FIG. 9 is a configuration diagram illustrating a configuration example of a wind measurement system according to a second embodiment of the present invention.

In FIG. 9, the same reference signs as those in FIG. 1 represent the same or corresponding parts.

This wind measurement system is provided with laser radar devices 11a to 11n, a data processing device 20, and wind turbine control devices 3a to 3n. The laser radar devices 11a to 11n differ from the laser radar devices 1a to 1n of the first embodiment in a signal processor. In the laser radar devices 11a to 11n, a signal processor 1110 to be described later is used in place of the signal processor 1010 in the first embodiment. The data processing device 20 is different from the data processing device 2 in the first embodiment in not including the wind vector calculator 2032 for calculating the wind vector.

The wind turbine control device 3a is a control device which performs control such as yaw control or pitch control of a wind turbine. For example, a personal computer (PC), a microcomputer and the like is used as the wind turbine control device 3a.

Figure 10:
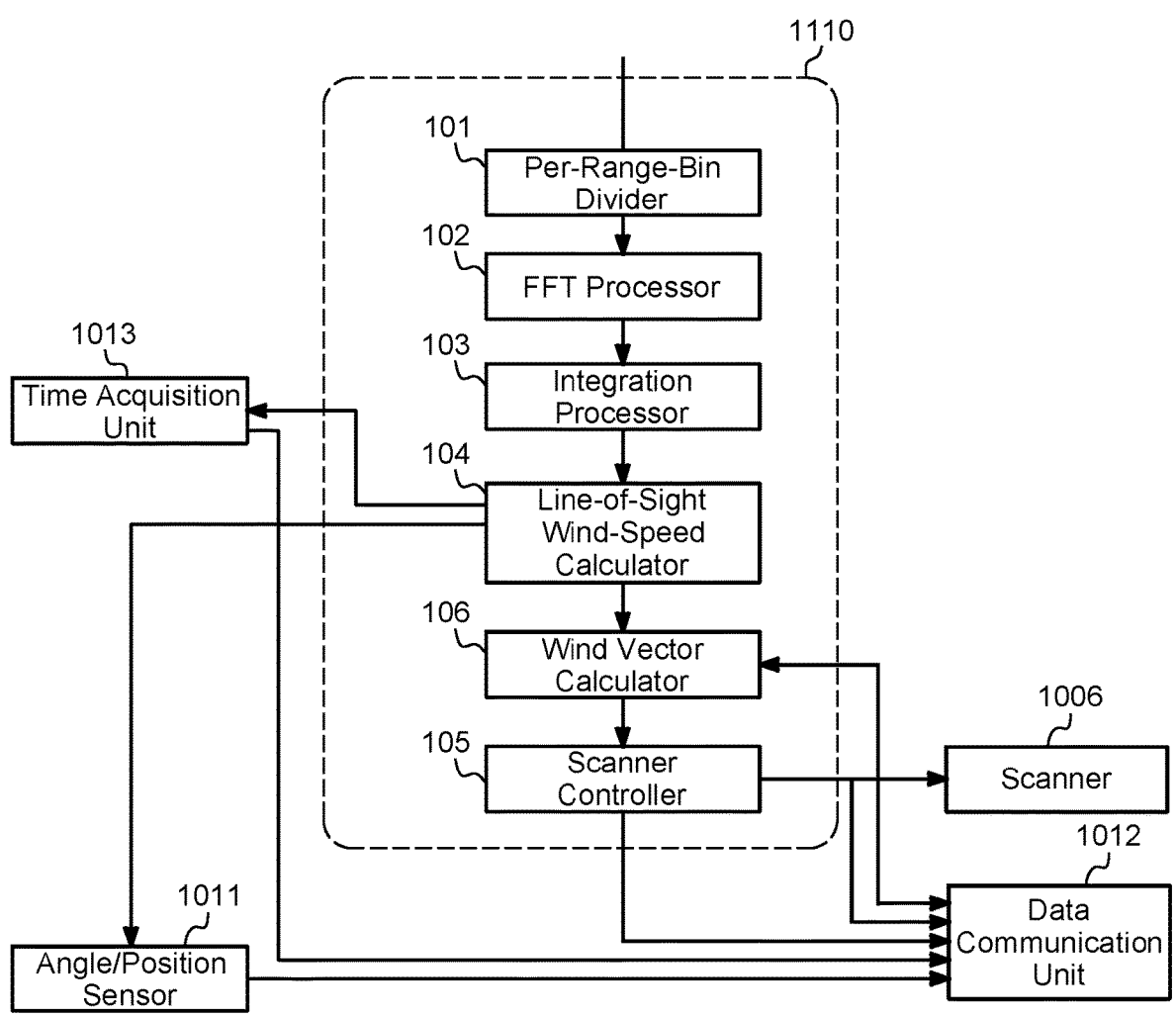
FIG. 10 is a configuration diagram illustrating a configuration example of a signal processor 1110 according to the second embodiment of the present invention.

FIG. 10 is a configuration diagram illustrating a configuration example of the signal processor 1110 according to the second embodiment of the present invention. In FIG. 10, the same reference signs as those in FIG. 3 represent the same or corresponding parts.

The signal processor 1110 is provided with a per-range-bin divider 101, a FFT processor 102, an integration processor 103, a line-of-sight wind-speed calculator 104, a scanner controller 105, and a wind vector calculator 106.

The wind vector calculator 106 is a calculator which calculates the wind vector by using value data of line-of-sight wind-speed output by the line-of-sight wind-speed calculator 104 and value data of line-of-sight wind-speed acquired from the data communication unit 1012, and outputs the calculated wind vector to the scanner controller 105 and a data communication unit 1012. For example, the wind vector calculator 106 is formed of a FPGA, an ASIC, a microcomputer and the like.

Next, an operation of the wind measurement system according to the second embodiment of the present invention is described.

Since operations of the laser radar device 11a other than the signal processor 1110 are similar to those in the first embodiment, the description thereof is omitted. Also, in the signal processor 1110, the operations of the per-range-bin divider 101, the FFT processor 102, the integration processor 103, the line-of-sight wind-speed calculator 104, and the scanner controller 105 are similar to those of the first embodiment, so that the description thereof is omitted.

The wind vector calculator 106 outputs the value of line-of-sight wind-speed output from the line-of-sight wind-speed calculator 104 to the data processing device 20 via the data communication unit 1012. Also, the wind vector calculator 106 receives the value of line-of-sight wind-speed for composing the wind vector together with the above-described value of line-of-sight wind-speed from the data processing device 20.

In this case, the operation of the data processing device 20 which receives the data from the data communication unit 1012 is the same as that in the flow except step S110 in FIG. 7. In the data processing device 20, a coordinate converter 2030 stores the data, a data selector 2031 collates the data and transmits the result to the laser radar device 11a.

The wind vector calculator 106 performs vector composition of the values of line-of-sight wind-speed output by the line-of-sight wind-speed calculator 104 and the value of line-of-sight wind-speed output by the data processing device 20 by the method described at step S110 in FIG. 7 to calculate the wind vector. The wind vector calculator 106 outputs the calculated wind vector to the scanner controller 105 and the data communication unit 1012.

The data communication unit 1012 outputs the wind vector to the wind turbine control device 3a. The wind turbine control device 3a controls the wind turbine based on the information of the wind vector.

Note that, although the data selector 2031 is herein provided in the data processing device 20, the data selector 2031 may also be provided in the laser radar device 11a. In this case, the data processing device 20 is such that the coordinate converter 2030 stores the data and transmits the data in response to the request of the laser radar device 11a, and the laser radar device 11a collates the data.

As is clear from above, according to the second embodiment of the present invention, as compared with the first embodiment, since the wind vector is calculated by the laser radar device, an arithmetic load may be reduced as compared to a case in which the data processing device performs a wind vector arithmetic operation of all the laser radar device. As a result, since a computer cost may be dispersed, wind direction wind speed information may be delivered to the wind turbine control device more quickly, so that the wind turbine control may be performed in further real time.

Third Embodiment

In the present embodiment, a method in which a wind measurement system is formed only of laser radar devices and the laser radar devices exchange data with each other is described. As a result, a data processing device becomes unnecessary, and a device configuration may be reduced.

Figure 11:
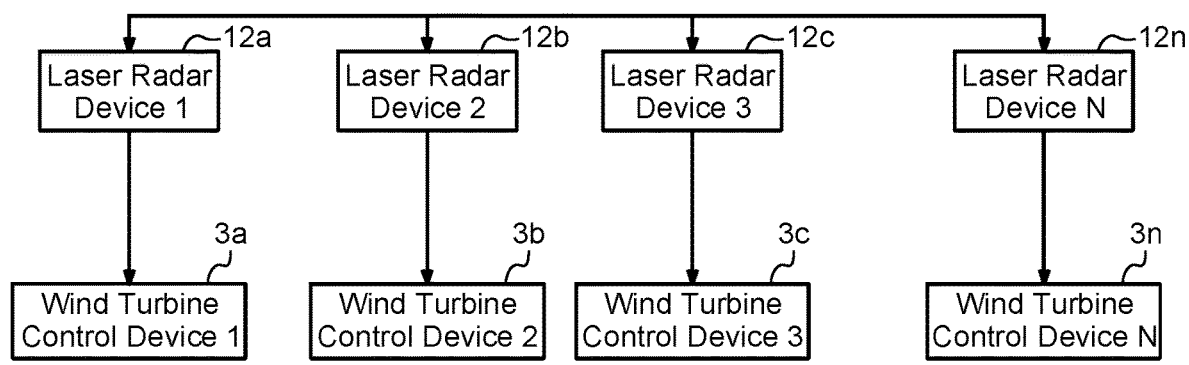
FIG. 11 is a configuration diagram illustrating a configuration example of a wind measurement system according to a third embodiment of the present invention.

FIG. 11 is a configuration diagram illustrating a configuration example of a wind measurement system according to a third embodiment of the present invention. In FIG. 11, the same reference signs as those in FIG. 9 represent the same or corresponding parts. The laser radar devices 12a to 12n differ from the laser radar devices 11a to 11n of the second embodiment in a signal processor. In the laser radar devices 12a to 12n, a signal processor 1210 to be described later is used in place of the signal processor 1110 in the second embodiment.

Figure 12:
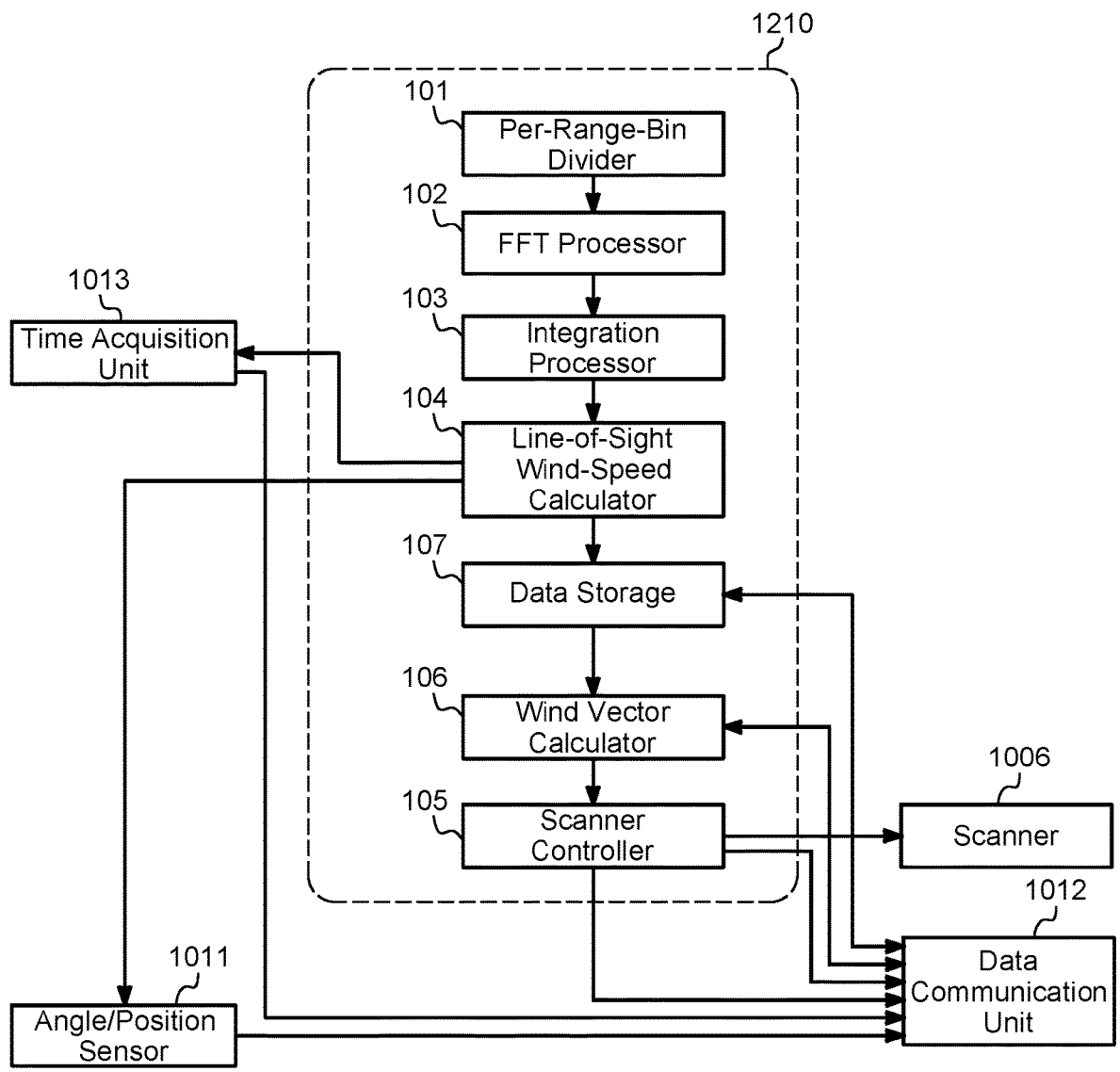
FIG. 12 is a configuration diagram illustrating a configuration example of a signal processor 1210 according to the third embodiment of the present invention.

FIG. 12 is a configuration diagram illustrating a configuration example of the signal processor 1210 according to the third embodiment of the present invention. In FIG. 12, the same reference signs as those in FIG. 10 represent the same or corresponding parts.

The signal processor 1210 is provided with a per-range-bin divider 101, a FFT processor 102, an integration processor 103, a line-of-sight wind-speed calculator 104, a scanner controller 105, a wind vector calculator 106, and a data storage 107.

The data storage 107 is a data storage which stores a value of line-of-sight wind-speed output by the value of line-of-sight wind-speed calculator 104 and the line-of-sight wind-speed acquired from another laser radar device via a data communication unit 1012. For example, the data storage 107 is formed of a FPGA, an ASIC, a microcomputer and the like.

Next, an operation of the wind measurement system according to the third embodiment of the present invention is described.

Since operations of the laser radar device 12a other than the signal processor 1210 are similar to those in the first embodiment, the description thereof is omitted. Also, in the signal processor 1210, the operations of the per-range-bin divider 101, the FFT processor 102, the integration processor 103, the line-of-sight wind-speed calculator 104, and the scanner controller 105 are similar to those of the first embodiment.

Upon receiving the line-of-sight data output by the line-of-sight wind-speed calculator 104, the data storage 107 communicates via the data communication unit 1012 with the laser radar device which is present within a peripheral distance radius D (m), and thereby acquires the value of line-of-sight wind-speed measured by a different radar device. Then, the data storage 107 outputs the value data of line-of-sight wind-speed output by the line-of-sight wind-speed calculator 104 and the value data of line-of-sight wind-speed acquired from the different laser radar device, to the wind vector calculator 106.

Herein, D (m) may be arbitrarily set by a user, or may be set so as to be a maximum distance corresponding to the value of line-of-sight wind-speed of the host laser radar device acquired most recently. In this case, D (m) is a variable value. Herein, the maximum distance is intended to mean the maximum distance at which an SNR associated with the value of line-of-sight wind-speed acquired by the host laser radar device is equal to or larger than a predetermined value. Since an amount of dust in the atmosphere varies in real time, making D (m) variable by the above-described method makes it possible to improve an effective data rate with a minimal database and without missing. Note that, since it is indispensable to unify coordinate systems of the values of line-of-sight wind-speed selected for calculation in the wind vector calculator 106, the data storage 107 has a function of the coordinate converter 2030 described in the first embodiment. Also, the data storage 107 has a function of the data selector 2031 according to the first embodiment for the case in which the line-of-sight data within the distance range D more than a desired number is acquired.

Since an operation of the wind vector calculator 106 is similar to that in the second embodiment, the description thereof is omitted.

As is apparent from the above, according to the third embodiment of the present invention, unlike the first and second embodiments, the laser radar devices exchange the value data of line-of-sight wind-speed with each other without intervention of the data processing device, so that the data processing device may be reduced. Also, since the laser radar device performs data communication with the laser radar device in the vicinity thereof, it is possible to reduce a communication amount and reduce a computer cost associated therewith.

REFERENCE SIGNS LIST 1a to 1n, 11a to 11n, 12a to 12n: Laser radar devices; 2 to 20: Data processing device; 3a to 3n: Wind turbine control devices; 1001: Optical oscillator; 1002: Optical Coupler; 1003: Optical modulator; 1004: Optical circulator; 1005: Scanner; 1006: Optical system; 1007: Wave coupler; 1008: Optical receiver; 1009: A/D converter; 1010, 1110, 1210: Signal processing units; 1011: Angle/position sensor; 1012: Data communication unit; 1013: Time acquisition unit; 101: Per-range-bin divider; 102: FFT processor; 103: Integration processor; 104: Line-of-sight wind-speed calculator; 105: Scanner controller; 106: Wind vector calculator; 107: Data storage; 201: Data communication device; 202: CPU; 203: Memory; 204: Storage device; 2030: Coordinate converter; 2031: Data selector; and 2032: Wind vector calculator.

The invention claimed is:

1. A data processing device comprising:
a data communication device configured to communicate with a plurality of laser radar devices to acquire a value of line-of-sight wind-speed; a laser emission angle, attitude information, position information, and a time, from each of the laser radar devices;
a storage device configured to store therein the value of line-of-sight wind-speed and the time;
a central processing unit configured to run a data selector with respect to a first value of line-of-sight wind-speed and a first time which are acquired from a laser radar device of the plurality of laser radar devices by the data communication device, to thereby select, from among values of line-of-sight wind-speed stored in the storage device, a second value of line-of-sight wind-speed which is measured as one of values of line-of-sight wind-speed by different laser radar device within a predetermined range of distance from the laser radar device and within a set time period from the first time, and configured to run a wind vector calculator to thereby calculate a wind vector using the first value of line-of-sight wind-speed which is newly acquired by the data communication device, and using the second value of line-of-sight wind-speed selected by the data selector; and
a memory configured to store the data selector and the wind vector calculator.

2. The data processing device according to claim 1, wherein:
the central processing unit is configured to run a coordinate converter to thereby perform a coordinate conversion of the value of line-of-sight wind-speed using the laser emission angle, the attitude information and the position information, and configured to store in the storage device a value of line-of-sight wind-speed obtained by the coordinate conversion; and
the memory is configured to preserve the coordinate converter.

3. A wind measurement system comprising
the data processing device according to claim 1; and
a laser radar device configured to:
radiate laser light into an atmosphere;
acquire a value of line-of-sight wind-speed in a radiation direction of the laser light;
transmit the acquired value of line-of-sight wind-speed to the data processing device; and
receive the wind vector from the data processing device.

4. The wind measurement system according to claim 3, wherein the first value of line-of-sight wind-speed which is newly acquired by the data communication device, and the second value of line-of-sight wind-speed selected by the data selector are acquired by different laser radar devices.

5. The wind measurement system according to claim 4, wherein:
in the data processing device, the central processing unit is configured to run a coordinate converter to thereby perform a coordinate conversion of the value of line-of-sight wind-speed using the laser emission angle, the attitude information and the position information, and configured to store in the storage device a value of line-of-sight wind-speed obtained by the coordinate conversion; and
the memory is configured to preserve the coordinate converter.

6. A laser radar device comprising:
an optical oscillator configured to emit laser light;
an optical modulator configured to modulate the laser light emitted by the optical oscillator;
an optical system configured to output, as transmission light, the laser light modulated by the optical modulator and receive, as received light, reflected light reflected by an object into which the transmission light propagates;
a line-of-sight wind-speed calculator configured to calculate a first value of line-of-sight wind-speed based on the laser light emitted by the optical oscillator and the received light received by the optical system;
a data communication unit configured to communicate with a different laser radar device which is present within a peripheral distance radius from the laser radar device; and
a wind vector calculator configured to calculate a wind vector using the first value of line-of-sight wind-speed and a second value of line-of-sight wind-speed which is acquired from the different laser radar device by the data communication unit, wherein
a position where the first value of line-of-sight wind-speed is measured, and a position where the second value of line-of-sight wind-speed is acquired are within a range defined by a set distance, and
the set distance is set to a maximum distance with which a signal-to-noise ratio associated with the first value of line-of-sight wind-speed is equal to or larger than a threshold.

* * * * *